United States Patent
Subramaniam et al.

(10) Patent No.: US 12,327,117 B2
(45) Date of Patent: Jun. 10, 2025

(54) SYSTEM, APPARATUS AND METHODS FOR PERFORMANT READ AND WRITE OF PROCESSOR STATE INFORMATION RESPONSIVE TO LIST INSTRUCTIONS

(71) Applicant: Intel Corporation, Santa Clara, CA (US)

(72) Inventors: Kameswar Subramaniam, Austin, TX (US); Jason W. Brandt, Austin, TX (US); H. Peter Anvin, San Jose, CA (US); Christopher M. Russell, Austin, TX (US); Gilbert Neiger, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 839 days.

(21) Appl. No.: 17/358,082

(22) Filed: Jun. 25, 2021

(65) Prior Publication Data

US 2022/0413859 A1 Dec. 29, 2022

(51) Int. Cl.
*G06F 9/30* (2018.01)
*G06F 9/455* (2018.01)
*G06F 9/48* (2006.01)

(52) U.S. Cl.
CPC ...... *G06F 9/30145* (2013.01); *G06F 9/30043* (2013.01); *G06F 9/30101* (2013.01); *G06F 9/30189* (2013.01); *G06F 9/45558* (2013.01); *G06F 9/4812* (2013.01); *G06F 2009/45591* (2013.01)

(58) Field of Classification Search
CPC ............... G06F 9/3004; G06F 9/30043; G06F 9/30101; G06F 9/455; G06F 9/45558
See application file for complete search history.

(56) References Cited

U.S. PATENT DOCUMENTS

| | | | |
|---|---|---|---|
| 7,937,700 B1 * | 5/2011 | Klaiber | G06F 9/45533 712/228 |
| 8,402,279 B2 | 3/2013 | Henry et al. | |
| 10,977,191 B2 | 4/2021 | Northup et al. | |
| 2015/0186077 A1 * | 7/2015 | Lee | G06F 3/0604 711/103 |
| 2021/0049028 A1 | 2/2021 | Price | |

OTHER PUBLICATIONS

Intel Corporation, U.S. Appl. No. 16/725,041, filed Dec. 23, 2019, Entitled "System, Apparatus and Method for dynamic pipeline stage control of data path dominant circuitry of an integrated circuit," 50 pgs.
Intel Corporation, Intel 64 and IA-32 Architectures Software Developer's Manual, vol. 1, Basic Architecture, Sep. 2016, 1-482 pgs.

* cited by examiner

*Primary Examiner* — Jacob Petranek
(74) *Attorney, Agent, or Firm* — Nicholson De Vos Webster & Elliott LLP

(57) ABSTRACT

In one embodiment, a processor includes: a front end circuit to fetch and decode a read list instruction, the read list instruction to cause storage to a memory of a software-provided list of processor state information; and an execution circuit coupled to the front end circuit. The execution circuit, in response to the decoded read list instruction, is to read the processor state information stored in the processor and store each datum of the processor state information into an entry of a data table in the memory. Other embodiments are described and claimed.

18 Claims, 13 Drawing Sheets

SYSTEM, APPARATUS AND METHODS FOR PERFORMANT READ AND WRITE OF PROCESSOR STATE INFORMATION RESPONSIVE TO LIST INSTRUCTIONS

BACKGROUND

Modern x86 processors define thousands of system registers, typically referred to as Model Specific Registers (MSRs). These registers are read and written by all kinds of software including basic input output software (BIOS), operating system (OS), drivers, and hypervisors. Common tasks like initializing system registers, application and virtual context switch, and tracing/debug, require reading or writing 10s or even 100s of these registers at a time and can be performance sensitive. Software traditionally uses long sequences of read and write instructions; but this is slow because it does not allow the processor to leverage its ability to pipeline and have multiple outstanding state reads and writes working in parallel.

DETAILED DESCRIPTION

Figure 1A:
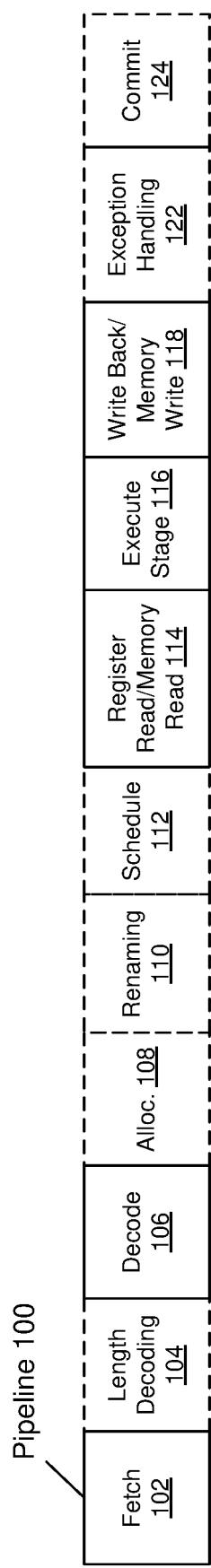
FIG. 1A is a block diagram illustrating both an exemplary in-order pipeline and an exemplary register renaming, out-of-order issue/execution pipeline according to embodiments of the invention.

In various embodiments, a processor is configured to execute instruction set architecture (ISA) instructions (which may originate from supervisor-level or user-level software) to read/write a software-provided list of processor state information. This processor state information may be stored in a plurality of registers and written to/from memory in a performant manner. For ease of discussion, embodiments are described with particular named instructions that cause execution of read/write operations with respect to processor state information stored in MSRs. However understand that embodiments are not limited in this regard and the instructions described herein, generally referred to as read list and write list instructions, may be used to cause read/write of arbitrary system registers identified in a list to/from memory in a performant manner.

In a particular embodiment for use in connection with MSRs, these instructions are referred to as "read MSR list" and "write MSR list" instructions (and more generally read and write list instructions, or collectively as list instructions), having the instruction mnemonics RDMSRLIST and WRMSRLIST, respectively. These instructions provide software a performant way to read and write multiple system registers or other locations that store processor state. These instructions may be used in connection with application and virtual machine context switches, to enhance the performance of these routines, while also being useful for other usages models like initialization and debug. For example, software can use a bitmap as described herein as a per process context switch mask. In this way, the software can maintain the list of MSR addresses in protected memory (e.g., read only to a specific guest), and just manipulate the bitmask per thread/guest to only save/restore the specific states that were modified by that context.

Software has full control over the state that it wants to read or write; and by use of read/write list instructions herein, greater flexibility may be realized as compared to conventional instructions to save and restore state such as the Intel® ISA instructions XSAVES/XRSTORS, which are executed in response to request of a vitalization agent, e.g., a hypervisor or virtual machine. Since an existing virtualization bitmap (VMX MSR) may be checked for every MSR in the list, virtualization enabling for the instructions described herein is enhanced as compared to conventional instructions (e.g., XSAVES/XRSTORS instructions) for saving and restoring state.

Also with a conventional save/restore technique, each SAVES/XRSTORS region is a static format. Each bit in a regions definition implies a specific sequence and list of system registers, including the exact bit format. Enabling a new region requires a coordinated change in the processor and software to understand the exact bits included in the new region. However since system registers relevant to features keep changing over time, MSRs are routinely added and removed. The static format defined one generation ago becomes quickly irrelevant. Embodiments may more flexibly adapt to changes in MSR definitions.

Figure 1B:
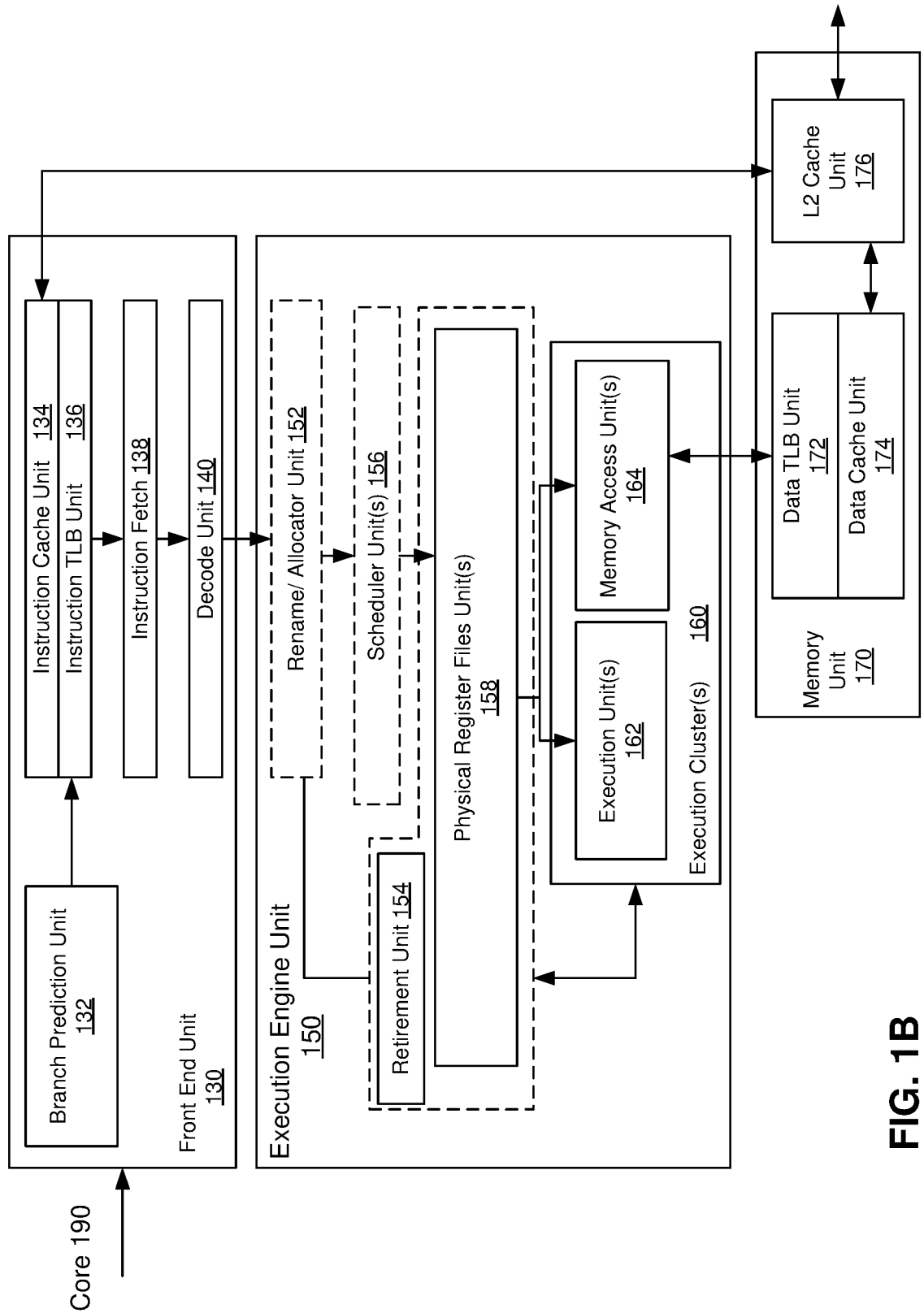
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124. Each of these stages may be configured to handle the read and write list ISA instructions of embodiments described herein.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2B:
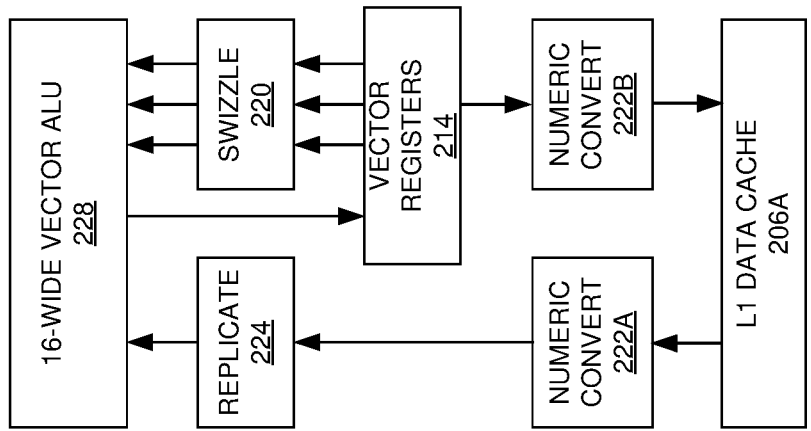
FIGS. 2A-B illustrate a block diagram of a more specific exemplary in-order core architecture in accordance with an embodiment of the present invention.
Figure 2A:
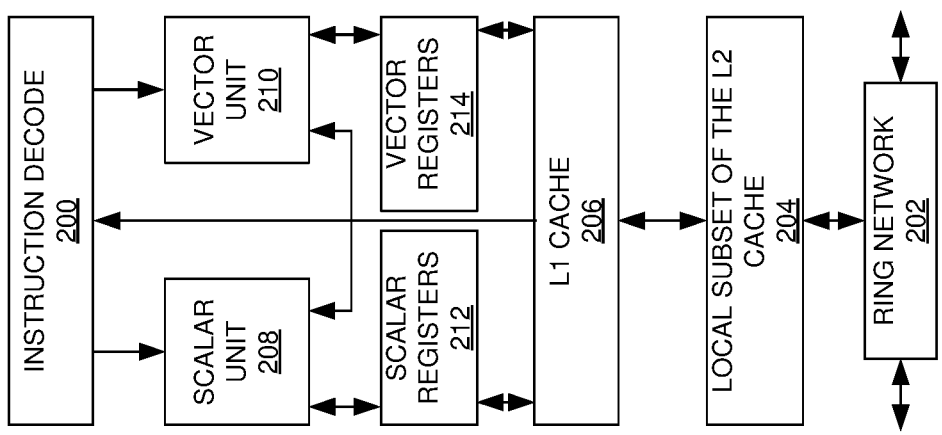

FIGS. 2A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 2A is a block diagram of a single processor core, along with its connection to the on-die interconnect network 202 and with its local subset of the Level 2 (L2) cache 204, according to embodiments of the invention. In one embodiment, an instruction decoder 200 supports the x86 instruction set with a packed data instruction set extension. An L1 cache 206 allows low-latency accesses to cache memory into the scalar and vector units. While in one embodiment (to simplify the design), a scalar unit 208 and a vector unit 210 use separate register sets (respectively, scalar registers 212 and vector registers 214) and data transferred between them is written to memory and then read back in from a level 1 (L1) cache 206, alternative embodiments of the invention may use a different approach (e.g., use a single register set or include a communication path that allow data to be transferred between the two register files without being written and read back).

The local subset of the L2 cache 204 is part of a global L2 cache that is divided into separate local subsets, one per processor core. Each processor core has a direct access path to its own local subset of the L2 cache 204. Data read by a processor core is stored in its L2 cache subset 204 and can be accessed quickly, in parallel with other processor cores accessing their own local L2 cache subsets. Data written by a processor core is stored in its own L2 cache subset 204 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 2B is an expanded view of part of the processor core in FIG. 2A according to embodiments of the invention. FIG. 2B includes an L1 data cache 206A part of the L1 cache 206, as well as more detail regarding the vector unit 210 and the vector registers 214. Specifically, the vector unit 210 is a 6-wide vector processing unit (VPU) (see the 16-wide ALU 228), which executes one or more of integer, single-precision float, and double-precision float instructions. The VPU supports swizzling the register inputs with swizzle unit 220, numeric conversion with numeric convert units 222A-B, and replication with replication unit 224 on the memory input.

Figure 3:
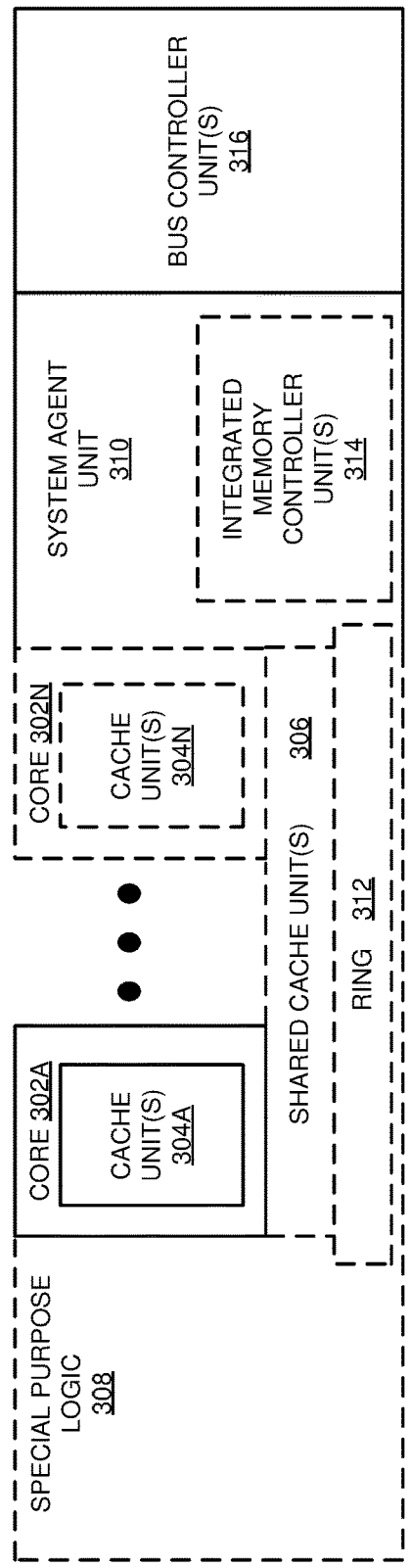
FIG. 3 is a block diagram of a processor that may have more than one core, may have an integrated memory controller, and may have integrated graphics according to embodiments of the invention.

FIG. 3 is a block diagram of a processor 300 that may have more than one core, may have an integrated memory controller, and may have integrated graphics according to embodiments of the invention. The solid lined boxes in FIG. 3 illustrate a processor 300 with a single core 302A, a system agent 310, a set of one or more bus controller units 316, while the optional addition of the dashed lined boxes illustrates an alternative processor 300 with multiple cores 302A-N, a set of one or more integrated memory controller unit(s) 314 in the system agent unit 310, and special purpose logic 308.

Thus, different implementations of the processor 300 may include: 1) a CPU with the special purpose logic 308 being integrated graphics and/or scientific (throughput) logic (which may include one or more cores), and the cores 302A-N being one or more general purpose cores (e.g., general purpose in-order cores, general purpose out-of-order cores, a combination of the two); 2) a coprocessor with the cores 302A-N being a large number of special purpose cores intended primarily for graphics and/or scientific (throughput); and 3) a coprocessor with the cores 302A-N being a large number of general purpose in-order cores. Thus, the processor 300 may be a general purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 300 may be a part of and/or may be implemented on one or more substrates using any of a number of process technologies, such as, for example, BiCMOS, CMOS, or NMOS.

The memory hierarchy includes one or more levels of cache within the cores 304A-N, a set of one or more shared cache units 306, and external memory (not shown) coupled to the set of integrated memory controller units 314. The set of shared cache units 306 may include one or more mid-level caches, such as level 2 (L2), level 3 (L3), level 4 (L4), or other levels of cache, a last level cache (LLC), and/or combinations thereof. While in one embodiment a ring based interconnect unit 312 interconnects the special purpose logic 308, the set of shared cache units 306, and the system agent unit 310/integrated memory controller unit(s) 314, alternative embodiments may use any number of well-known techniques for interconnecting such units. In one embodiment, coherency is maintained between one or more cache units 306 and cores 302-A-N.

In some embodiments, one or more of the cores 302A-N are capable of multithreading. The system agent 310 includes those components coordinating and operating cores 302A-N. The system agent unit 310 may include for example a power control unit (PCU) and a display unit. The PCU may be or include logic and components needed for regulating the power state of the cores 302A-N and the special purpose logic 308.

The cores 302A-N may be homogenous or heterogeneous in terms of architecture instruction set; that is, two or more of the cores 302A-N may be capable of executing the same instruction set, while others may be capable of executing only a subset of that instruction set or a different instruction set.

FIGS. 4-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
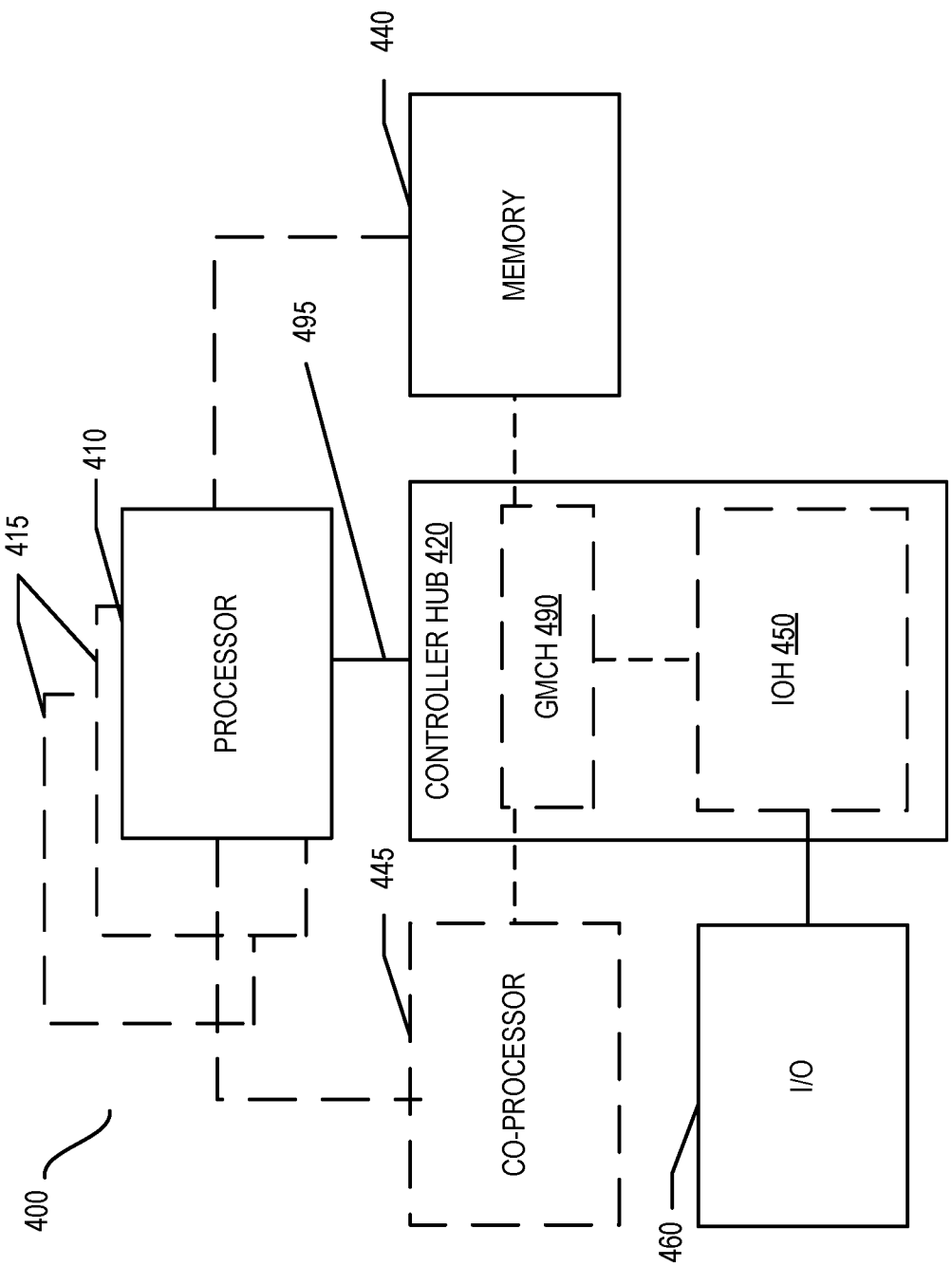
FIG. 4 is a block diagram of a system in accordance with one embodiment of the present invention.

Referring now to FIG. 4, shown is a block diagram of a system 400 in accordance with one embodiment of the present invention. The system 400 may include one or more processors 410, 415, which are coupled to a controller hub 420. In one embodiment, the controller hub 420 includes a graphics memory controller hub (GMCH) 490 and an Input/Output Hub (IOH) 450 (which may be on separate chips); the GMCH 490 includes memory and graphics controllers to which are coupled memory 440 and a coprocessor 445; the IOH 450 couples input/output (I/O) devices 460 to the GMCH 490. Alternatively, one or both of the memory and graphics controllers are integrated within the processor (as described herein), the memory 440 and the coprocessor 445 are coupled directly to the processor 410, and the controller hub 420 in a single chip with the IOH 450.

The optional nature of additional processors 415 is denoted in FIG. 4 with broken lines. Each processor 410, 415 may include one or more of the processing cores described herein and may be some version of the processor 300.

The memory 440 may be, for example, dynamic random access memory (DRAM), phase change memory (PCM), or a combination of the two. For at least one embodiment, the controller hub 420 communicates with the processor(s) 410, 415 via a multidrop bus, such as a frontside bus (FSB), point-to-point interface, or similar connection 495.

In one embodiment, the coprocessor 445 is a special-purpose processor, such as, for example, a high-throughput MIC processor, a network or communication processor, compression engine, graphics processor, GPGPU, embedded processor, or the like. In one embodiment, controller hub 420 may include an integrated graphics accelerator.

There can be a variety of differences between the physical resources 410, 415 in terms of a spectrum of metrics of merit including architectural, microarchitectural, thermal, power consumption characteristics, and the like.

In one embodiment, the processor 410 executes instructions that control data processing operations of a general type. Embedded within the instructions may be coprocessor instructions. The processor 410 recognizes these coprocessor instructions as being of a type that should be executed by the attached coprocessor 445. Accordingly, the processor 410 issues these coprocessor instructions (or control signals representing coprocessor instructions) on a coprocessor bus or other interconnect, to coprocessor 445. Coprocessor(s) 445 accept and execute the received coprocessor instructions.

Figure 5:
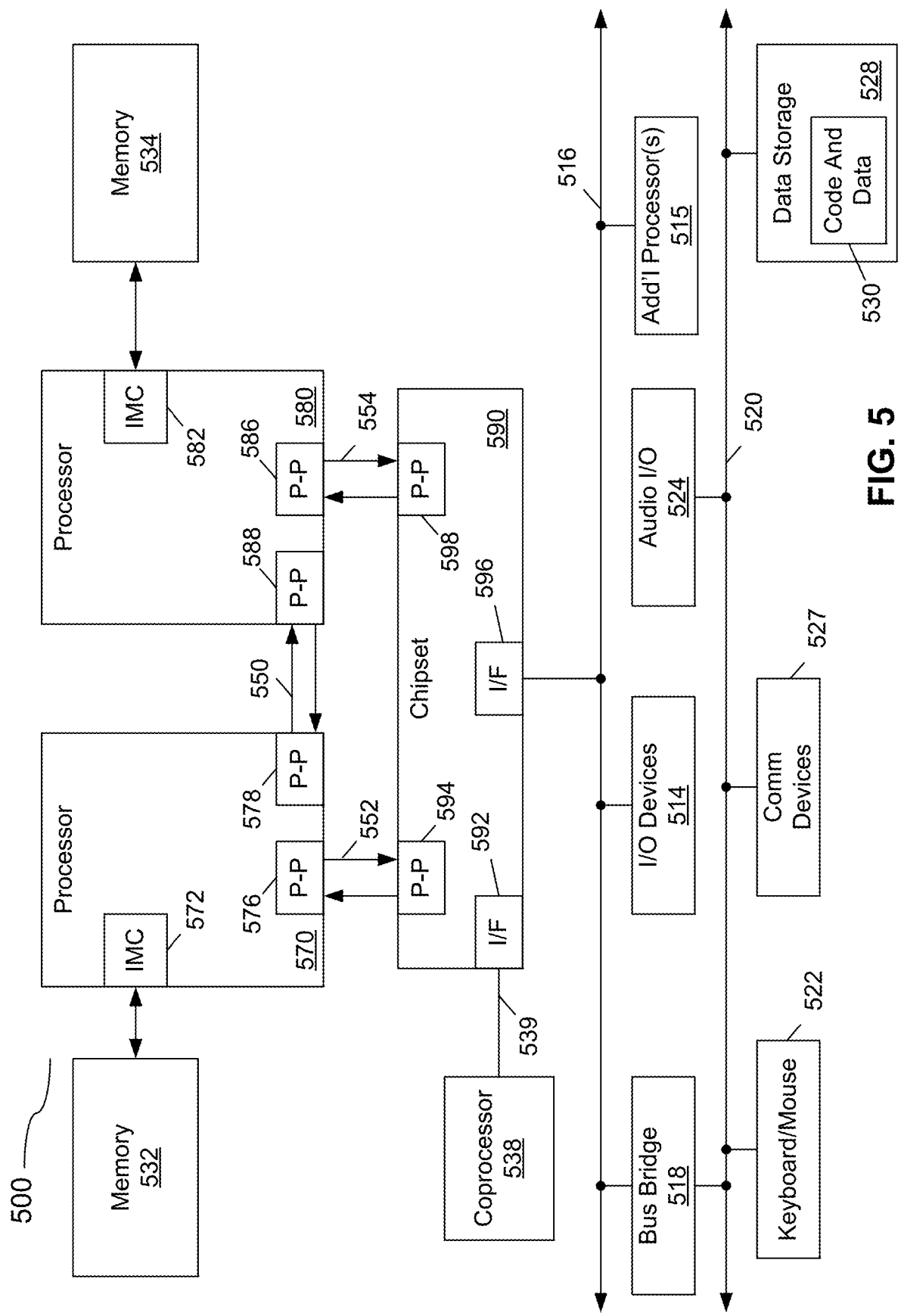
FIG. 5 is a block diagram of a first more specific exemplary system in accordance with an embodiment of the present invention.

Referring now to FIG. 5, shown is a block diagram of a first more specific exemplary system 500 in accordance with an embodiment of the present invention. As shown in FIG. 5, multiprocessor system 500 is a point-to-point interconnect system, and includes a first processor 570 and a second processor 580 coupled via a point-to-point interconnect 550. Each of processors 570 and 580 may be some version of the processor 300. In one embodiment of the invention, processors 570 and 580 are respectively processors 410 and 415, while coprocessor 538 is coprocessor 445. In another embodiment, processors 570 and 580 are respectively processor 410 and coprocessor 445.

Processors 570 and 580 are shown including integrated memory controller (IMC) units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may optionally exchange information with the coprocessor 538 via a high performance interface 592. In one embodiment, the coprocessor 538 is a special-purpose processor, such as, for example, a high throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another I/O interconnect bus, although the scope of the present invention is not so limited.

As shown in FIG. 5, various 1/0 devices 514 may be coupled to first bus 516, along with a bus bridge 518 which couples first bus 516 to a second bus 520. In one embodiment, one or more additional processor(s) 515, such as coprocessors, high-throughput MIC processors, GPGPU's, accelerators (such as, e.g., graphics accelerators or digital signal processing (DSP) units), field programmable gate arrays, or any other processor, are coupled to first bus 516. In one embodiment, second bus 520 may be a low pin count (LPC) bus. Various devices may be coupled to a second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to the second bus 520. Note that other architectures are possible. For example, instead of the point-to-point architecture of FIG. 5, a system may implement a multi-drop bus or other such architecture.

Figure 6:
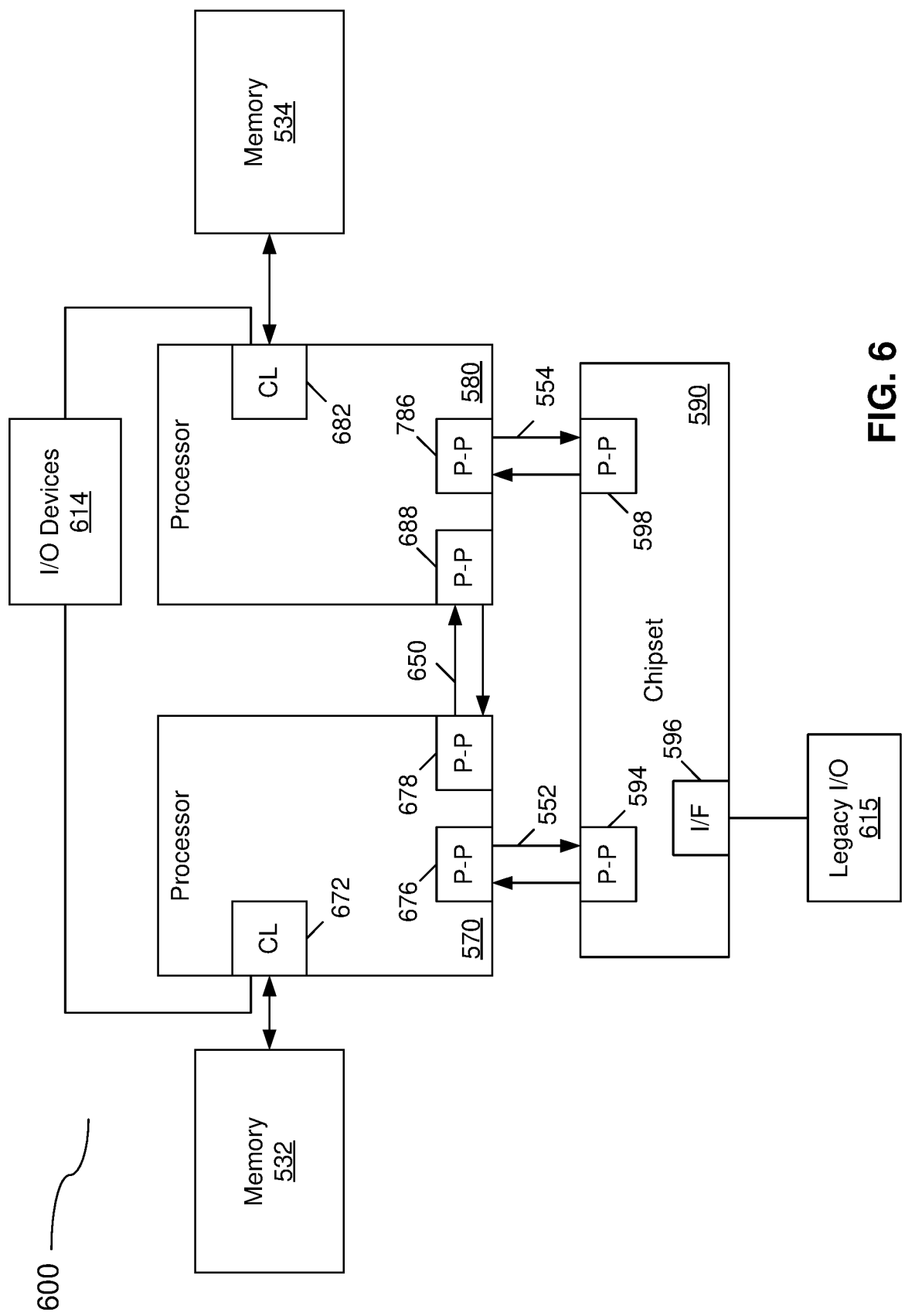
FIG. 6 is a block diagram of a second more specific exemplary system in accordance with an embodiment of the present invention.

Referring now to FIG. 6, shown is a block diagram of a second more specific exemplary system 600 in accordance with an embodiment of the present invention. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 570, 580 may include integrated memory and I/O control logic ("CL") 672 and 682, respectively. Thus, the CL 672, 682 include integrated memory controller units and include I/O control logic. FIG. 6 illustrates that not only are the memories 532, 534 coupled to the CL 672, 682, but also that I/O devices 614 are also coupled to the control logic 672,682. Legacy I/O devices 615 are coupled to the chipset 590.

Figure 7:
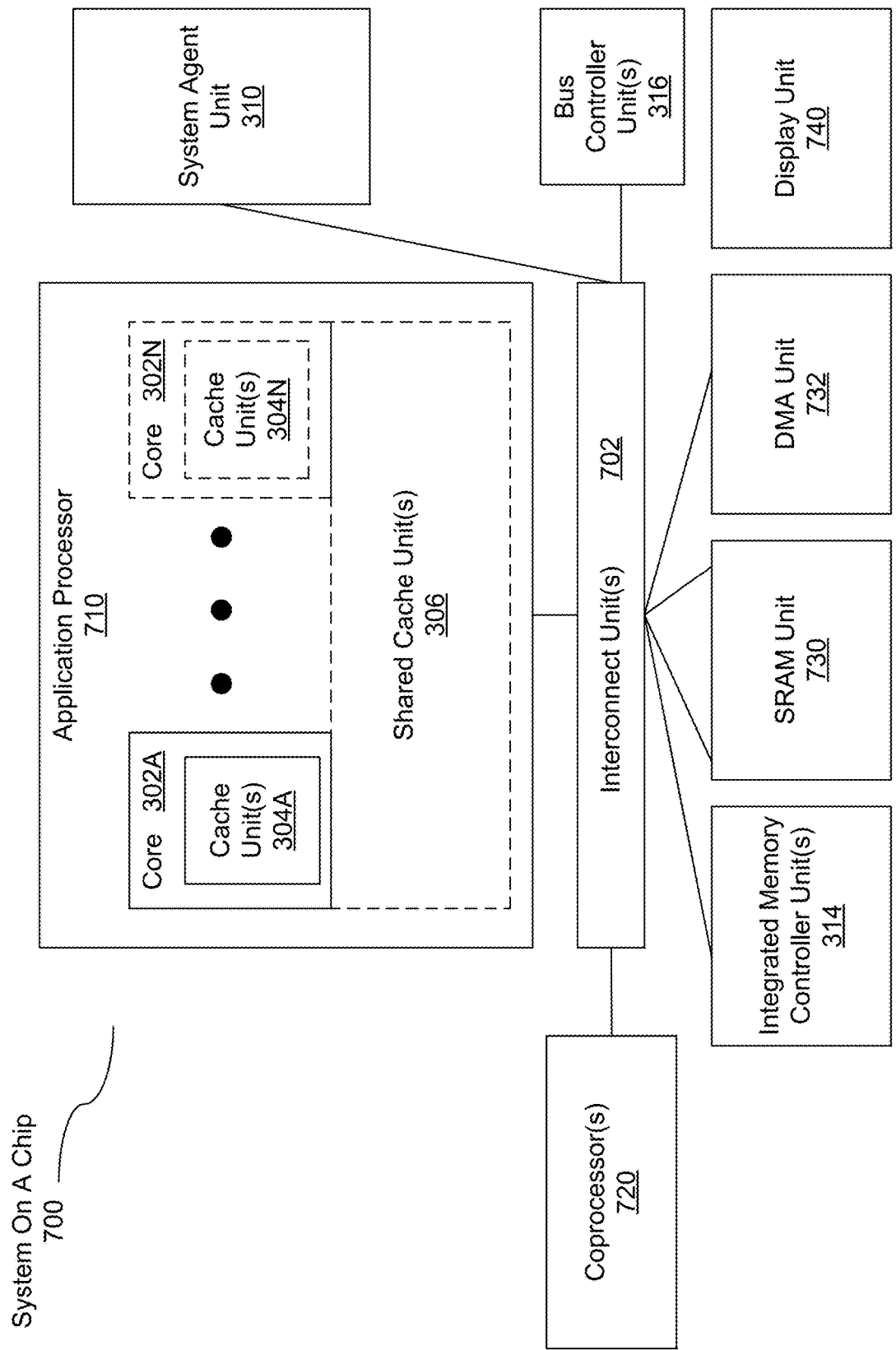
FIG. 7 is a block diagram of a SoC in accordance with an embodiment of the present invention.

Referring now to FIG. 7, shown is a block diagram of a SoC 700 in accordance with an embodiment of the present invention. Similar elements in FIG. 3 bear like reference numerals. Also, dashed lined boxes are optional features on more advanced SoCs. In FIG. 7, an interconnect unit(s) 702 is coupled to: an application processor 710 which includes a set of one or more cores 302A-N, cache units 304A-N, and shared cache unit(s) 306; a system agent unit 310; a bus controller unit(s) 316; an integrated memory controller unit(s) 314; a set of one or more coprocessors 720 which may include integrated graphics logic, an image processor, an audio processor, and a video processor; a static random access memory (SRAM) unit 730; a direct memory access (DMA) unit 732; and a display unit 740 for coupling to one or more external displays. In one embodiment, the coprocessor(s) 720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 530 illustrated in FIG. 5, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 8:
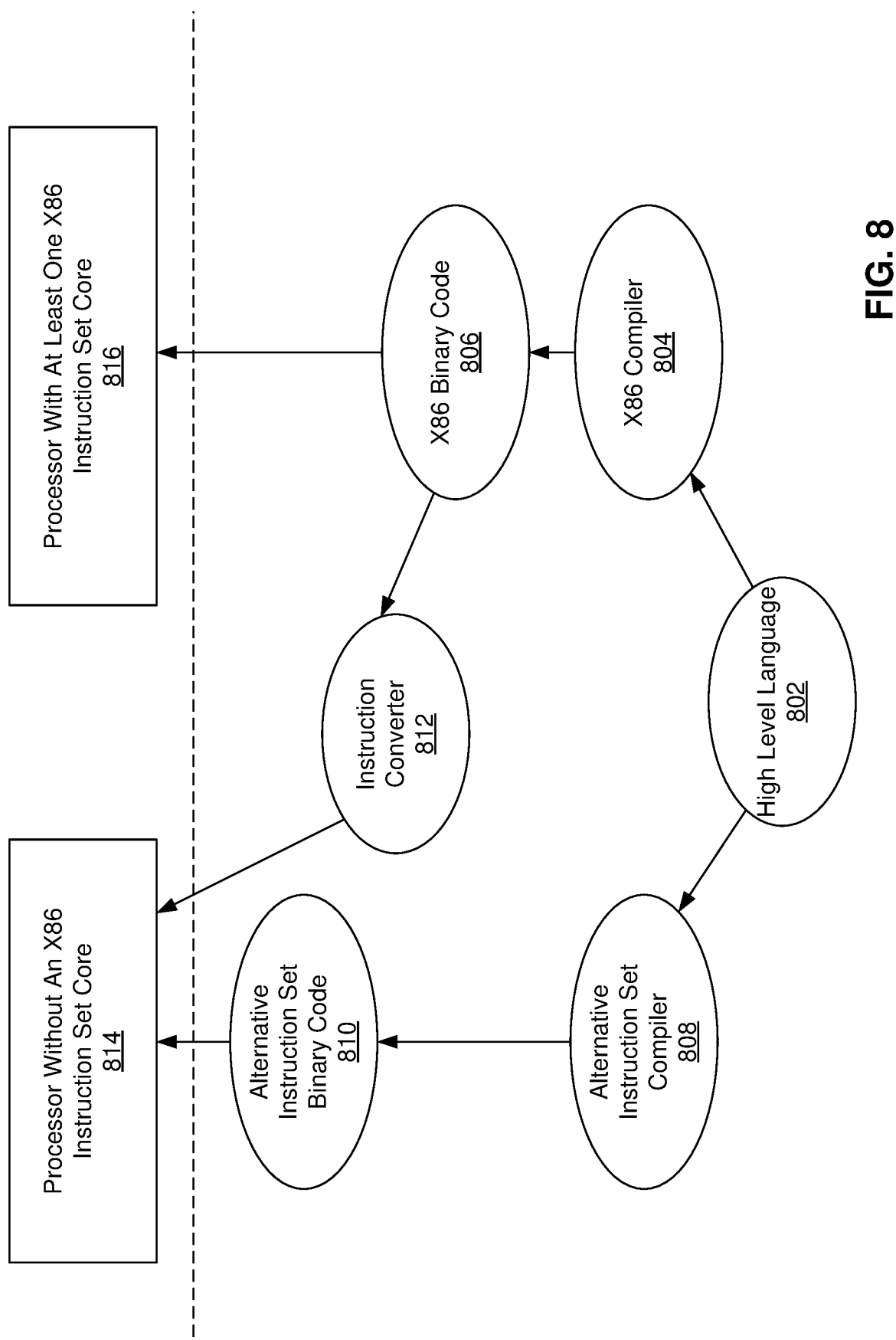
FIG. 8 is a block diagram contrasting the use of a software instruction converter to convert binary instructions in a source instruction set to binary instructions in a target instruction set according to embodiments of the invention.

FIG. 8 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 8 shows a program in a high level language 802 may be compiled using a first compiler 804 to generate a first binary code (e.g., x86) 806 that may be natively executed by a processor with at least one first instruction set core 816. In some embodiments, the processor with at least one first instruction set core 816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel® processor with at least one x86 instruction set core. The first compiler 804 represents a compiler that is operable to generate binary code of the first instruction set 806 (e.g., object code) that can, with or without additional linkage processing, be executed on the processor with at least one first instruction set core 816. Similarly, FIG. 8 shows the program in the high level language 802 may be compiled using an alternative instruction set compiler 808 to generate alternative instruction set binary code 810 that may be natively executed by a processor without at least one first instruction set core 814 (e.g., a processor with cores that execute the MIPS instruction set of MIPS Technologies of Sunnyvale, CA and/or that execute the ARM instruction set of ARM Holdings of Sunnyvale, CA). The instruction converter 812 is used to convert the first binary code 806 into code that may be natively executed by the processor without an first instruction set core 814. This converted code is not likely to be the same as the alternative instruction set binary code 810 because an instruction converter capable of this is difficult to make; however, the converted code will accomplish the general operation and be made up of instructions from the alternative instruction set. Thus, the instruction converter 812 represents software, firmware, hardware, or a combination thereof that, through emulation, simulation or any other process, allows a processor or other electronic device that does not have a first instruction set processor or core to execute the first binary code 806.

Figure 9:
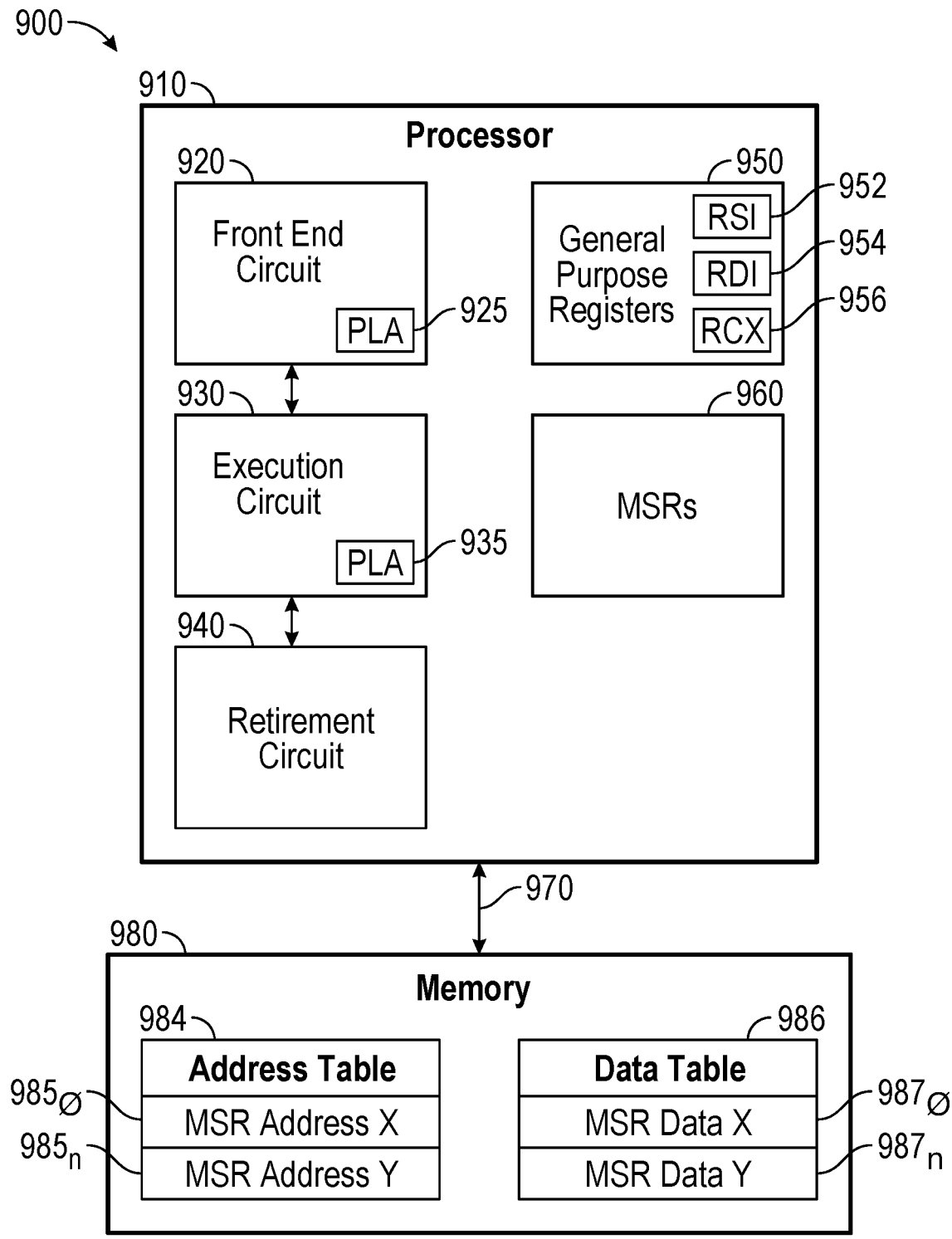
FIG. 9 is a high level block diagram of a system according to an embodiment.

Referring now to FIG. 9, shown is a high level block diagram of a system in accordance with an embodiment. As shown in FIG. 9, system 900 may be any type of computing platform, ranging from a small portable device to a larger device. In any case, system 900 includes a processor 910 that is coupled to a memory 980 via a given memory interconnect 970. In different implementations, processor 910 may be a multicore processor or other type of SoC. In the illustration of FIG. 9, certain features of processor 910 are shown that are involved in performing list read and write instructions as described herein.

In FIG. 9, processor 910 includes, at a high level, a front end circuit 920, an execution circuit 930, and a retirement circuit 940. In operation, front end circuit 920 may fetch and decode instructions and provide decoded instructions for execution in execution circuit 930. After execution, instructions may be retired within retirement circuit 940. To perform operations, the various circuits within processor 910 may interact with a set of general purpose registers 950 and MSRs 960. Of course additional structures are present in a given processor.

To perform a list read and write operation in response to the instructions disclosed herein, one or more of front end circuit 920 and execution circuit 930 may include corresponding programmable logic arrays (PLAs) 925, 935. The PLAs, responsive to information associated with such instructions, may take action to enable instruction execution in a performant manner.

Note that representative registers 952, 954 and 956 are shown within general purpose registers 950. These registers may be used in a representative use case to store operands used by list read and write instructions. For example, register 952 (RSI) may be used to store a base address of an address table in memory, while register 954 (RDI) may be used to store a base address of a data table in memory. In turn, register 956 (RCX) may store a bitmap of valid bits for a given list instruction.

With further reference to FIG. 9, memory 980 is shown to include a plurality of tables, namely an address table 984 and a data table 986. In embodiments herein, address table 984 may be located at a base address indicated by the value stored in RSI register 952, and may include a plurality of entries 985o-985n, each of which may store an address of a MSR associated with a list instruction. In turn, data table 986 may be located at a base address indicated by the value stored in RDI register 954, and may include a plurality of entries 987o-987n, each of which may store data of a MSR associated with a list instruction. Understand while shown at this high level in FIG. 9, many variations and alternatives are possible.

In one example implementation, both RDMSRLIST and WRMSRLIST instructions take 3 implied input operands as follows: RSI, which is to store a linear address of a table in memory of 8-byte MSR addresses; RDI, which is to store a linear address of a table in memory of 8-byte MSR data to be read/written; and RCX, which is to store a 64-bit bitmap of valid bits for the MSRs. Of course different widths are possible in other embodiments.

In one embodiment, these instructions may have the formats shown in Table 1.

TABLE 1

| Opcode | Instruction | Op/En | 64-Bit Mode | Compat/Leg Mode | Description |
| --- | --- | --- | --- | --- | --- |
| F2 0F 01 C6 | RDMSRLIST | Z0 | Valid | Invalid | Read requested list of MSRs, and store the read value to memory |
| F3 0F 01 C6 | WRMSRLIST | Z0 | Valid | Invalid | Write requested list of MSRs with the values specified in memory |

In this embodiment, the instruction operand encoding may be as shown in Table 2.

TABLE 2

| Op/En | Operand 1 | Operand 2 | Operand 3 | Operand 4 |
| --- | --- | --- | --- | --- |
| Z0 | NA | NA | NA | NA |

Understand that while in this embodiment, the operands are implicitly identified, in other examples the operands can be specified in the instructions themselves.

These instructions may, at a high level, execute per the functionality described in Table 3.

TABLE 3

| | RDMSRLIST and WRMSRLIST take 3 implied input operands. |
| --- | --- |
| RSI: | Linear address of a table in memory of 8-byte MSR addresses |
| RDI: | Linear address of a table in memory of 8-byte MSR data to be read/written |
| RCX: | 64-bit bitmask of valid bits for the MSRs Bit 0 is the valid bit for entry 0 in the above table, and so on. |

As a matter of convention, the bitmap may be arranged such that bit 0 is the valid bit for entry 0 in the above tables, and so on. In general, for each RCX bit [n] from 0 to 63, if RCX[n] is 1, a RDMSRLIST will cause a read of the MSR specified at entry [n] in the address table; and write it out to memory at the entry [n] in the data table. And in turn, WRMSRLIST instruction executes to write the MSR specified at entry [n] in the address table with the value read from memory at the entry [n] in the data table. During execution of either instruction, the processor clears a given bit of the bitmap (RCX[n]) after it finishes handling the MSR corresponding to the bit.

While an implementation described herein has a maximum of 64 MSRs that can be processed by either of these instructions at a time, embodiments are not limited in this regard.

Note that in execution, there is no separate count operand needed. Instead software sets as many bits in RCX as the number of MSRs it wants to be handled. To effect efficient operation of list read and write instructions in accordance with embodiments, various software agents may initialize certain state to allow these instructions to execute in a performant manner.

Figure 10:
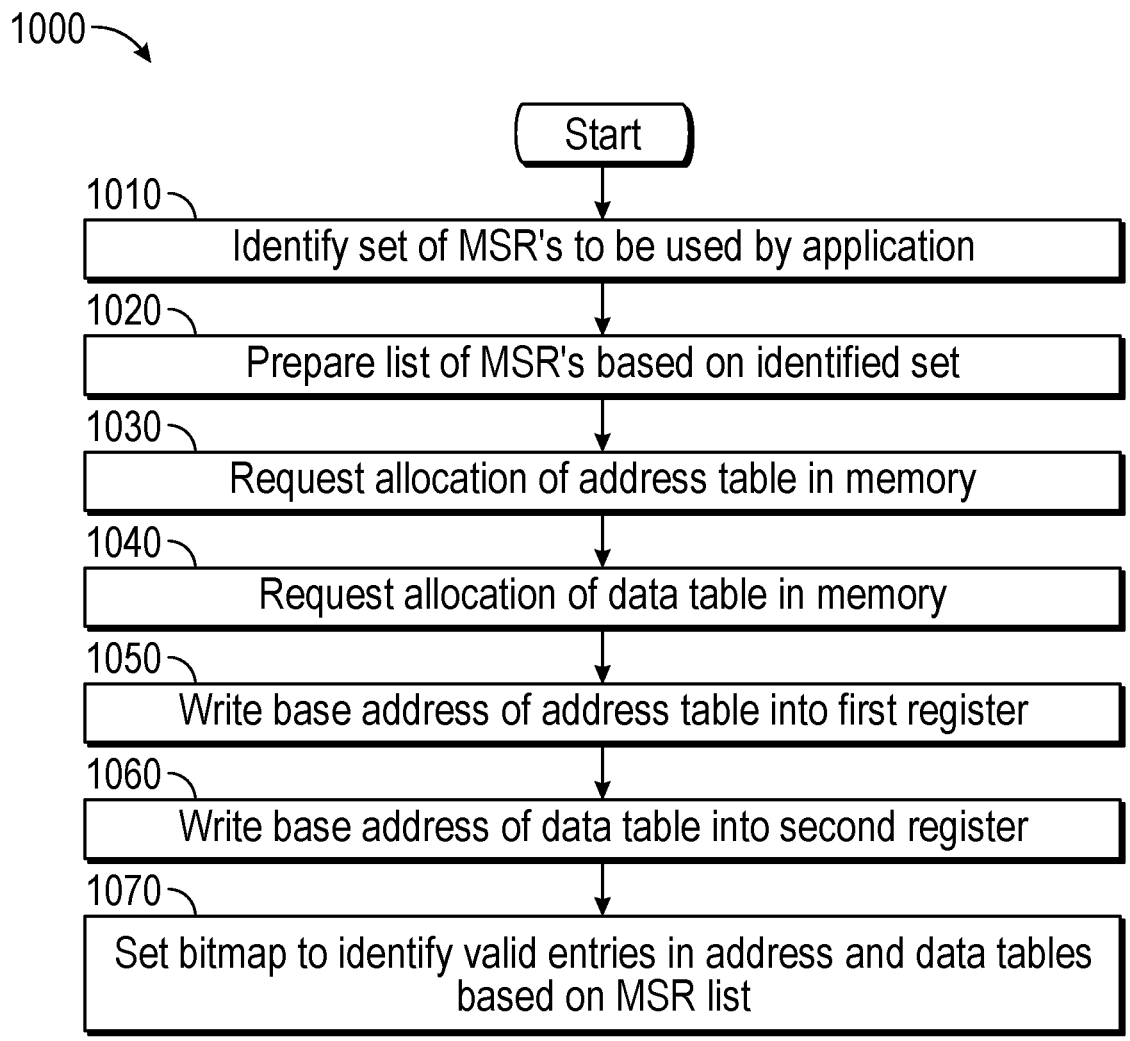
FIG. 10 is a flow diagram of a method according to an embodiment.

Referring to FIG. 10, shown is a flow diagram of a method in accordance with an embodiment. More specifically, method 1000 of FIG. 10 may be executed by software that executes on a processor having hardware circuitry to implement list read and write instructions as described herein. Such software may be supervisor-level software or user-level software. As shown, method 1000 begins by identifying a set of MSRs to be used by an application (block 1010). For example, an application may have information to identify a list of MSRs that it is to use during operation. From this identified set, at block 1020 a list of the MSRs may be prepared.

Next control passes to block 1030 where the application may request allocation of an address table in memory. For example, the application may request an OS to allocate this table (which in an embodiment may include 64 entries, each of 8 bytes width). The OS may perform a memory allocation function to allocate this table. Then at block 1040, the application may request allocation of a data table in memory, e.g., also 64 entries, each 8 bytes wide. Control next passes to block 1050 where a base address of the address table (which may be obtained via the memory allocation function) may be written into a first register (e.g., a general purpose register such as RSI, continuing with the above example). To this end, the application may issue a write instruction to write this base address to the indicated destination register. Next, at block 1060 a base address of the data table (which may be obtained via the memory allocation function) may be written into a second register (e.g., a general purpose register such as RDI, continuing with the above example).

Finally, at block 1070 a bitmap may be set. Note that this bitmap identifies valid entries within the address and data tables, and may be based on the MSR list. At this point, the processor state is appropriately configured (and memory tables allocated) such that list read and write instructions may validly execute.

Figure 11:
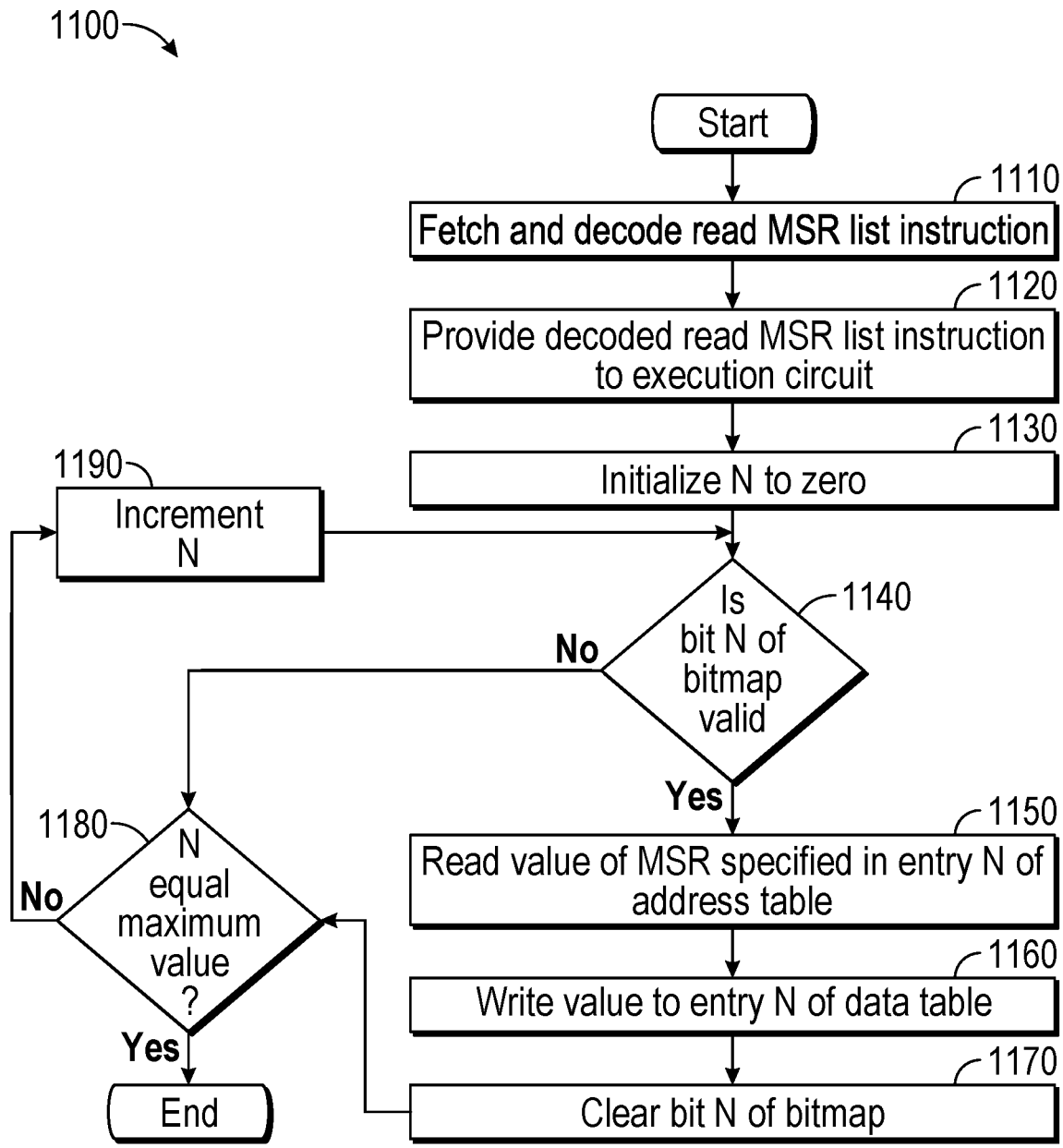
FIG. 11 is a flow diagram of a method according to an embodiment.

Referring now to FIG. 11, shown is a flow diagram of a method in accordance with another embodiment. More specifically, method 1100 is a method for executing a read MSR list instruction in accordance with an embodiment. As such, method 1100 may be executed in a processor having hardware circuitry (alone, and/or in combination with firmware and/or software) to implement list read and write instructions as described herein.

Method 1100 begins by fetching and decoding a read MSR list instruction (block 1110), which may be performed by a front end circuit. Next at block 1120 the front end circuit may provide the decoded read and MSR list instruction to an execution circuit.

Control next passes to block 1130 where a variable N may be initialized to zero. Access may be made to a bitmap associated with this read MSR list instruction to determine whether bit N is valid (diamond 1140). If so, control passes to block 1150 where the value of the MSR specified in entry N of the address table may be read. Then, at block 1160 this value is written to entry N of the data table. On successful writing of this MSR value to memory, at block 1170 bit N of the bitmap may be cleared.

Still with reference to FIG. 11, at diamond 1180 it may be determined whether the value of N equals a maximum value (e.g., 63). If so, method 1100 may conclude. Otherwise control passes to block 1190 where N may be incremented and control passes back to diamond 1140.

While in this implementation a variable is incremented to pass through all N bits of a bitmap, in other cases a scan operation may be performed. For example the processor, e.g., responsive to a scan instruction, may rapidly scan the values in the bitmap to identify the next valid bit corresponding to a next MSR within a list.

Understand while shown at this high level in the embodiment of FIG. 11, many variations and alternatives are possible. For example, in some cases a processor can load ahead for one or more entries. That is, during a given iteration, a next MSR address can be obtained, and it can be determined, e.g., what handler to use. For example, during a given iteration, a next MSR address can be obtained, and it can be decoded ahead of time to determine what special actions are to be performed as part of reading or writing the MSR. In this way, the processor can transition to the handler for the next MSR without serialization between iterations (unlike a software loop of RDMSR/WRMSR instructions).

As further possibilities, in an embodiment software can use MSRLIST instructions for a performance optimization to minimize the state being switched on context switches. This is so, since for many MSRs, software controls the MSR value, and values only change with a WRMSR instruction. As such, software can track when a process changes a type of MSR to a non-zero value (e.g., a first usage of a performance monitor) in a variable. Assume that this variable sets a bit when a given MSR has been used. On a context switch, software can OR this variable from an old process to the same variable for a new process. The resulting bits that are zero mean that they were Initialized and are still Initialized, and thus do not need to be written. As a result, software can clear valid bits in the MSRLIST bitmask corresponding to that type of MSR, reducing read/write operations.

Consider the following example of a RDMSRLIST instruction, and associated state shown in Table 4:

TABLE 4

| RCX bit pos Index | RSI + [Index*8] LinAddr | Mem[RSI + (Index*8)] MSRaddr | RCX [index] | RDI + [Index*8] LinAddr | Mem[RDI + Index*8)] MSR value |
| --- | --- | --- | --- | --- | --- |
| 0 | 0 × 3400 | IA32_PQR | 1 (Valid) | 0 × 4208 | 0 × 00000017 |
| 1 | 0 × 3408 | IA32_FSBASE | 1 (Valid) | 0 × 4210 | 0 × 02000000 |
| 2 | 0 × 3410 | IA32_SPEC_CTL | 1 (Valid) | 0 × 4218 | . . . |
| 3 | 0 × 3418 | IA32_PRED_CMD | 0 (Suppress) | 0 × 4220 | . . . |
| 4 | 0 × 3420 | IA32_GSBASE | 1 (Valid) | 0 × 4228 | 0 × 04000000 |

RSI = 0 × 3400 Base Linear Address of MSR address table
RDI = 0 × 4208 Base Linear Address of MSR data table
RCX = 0 × 17 Valid bitmap When the RDMSRLIST instruction is executed, the processor reads the 4 enabled MSRs as indicated by RCX and the address table (pointed to by the value in RSI). Per Table 1 above, these registers are: IA32_PQR, IA32_FSBASE, IA32_SPEC_CTRL and IA32_GSBASE. The processor writes their values to memory at indices 0, 1, 2, 4 correspondingly in the data table (pointed to by the value stored in RDI).

Similarly, an invocation of the WRMSRLIST instruction with the same values of RCX, RSI, and RDI update the same 4 MSRs with the values read from the data table in memory.

Note that as each MSR is read/written, the corresponding bit in RCX is cleared. If any of these accesses fault, either due to the loads/stores faulting, or the MSR read/write itself taking a valid general protection (GP) fault due to reserved bit checks, then the state of RCX naturally indicates which MSR operations were completed, and which were not. This feature makes the MSRLIST instructions re-entrant, and software can choose to handle the exception, or skip the MSR in question by clearing the lowest RCX bit that is currently set and continue with the instruction execution.

With respect to RDMSRLIST iterations, the processor does not guarantee that MSR reads across iterations happen in order. Stated another way, the processor does not ensure that a RDMSR in iteration "n" will be performed only after previous iterations ("n−1"). If software desires to enforce an ordering, it can do so by inserting a new dummy "IA32_SERIALIZE" RDMSR instruction to the MSR, which simply stalls until all older MSR reads execute.

WRMSRLIST is not an architecturally serializing instruction, and thus does not perform a store_fence. However, MSR writes are always done in order, meaning the processor ensures that an MSR in iteration "n" will be written only after previous iterations ("n−1"). If the older MSR writes had a side effect that affects the behavior of the next MSR, the processor ensures that side effect is honored.

However, the processor is still allowed (but not required) to "load ahead" in the list. For example, an old memory type may be used for loads/stores to list memory despite memory type range register (MTRR) change. Or for a single translation lookaside buffer (TLB) invalidation, before read/write for iteration "n", a page may be touched and a page fault taken on a list entry for iteration "n+1".

In some cases, certain MSRs may be excluded from MSRLIST instruction inclusion, as some MSRs will incur a general protection fault if accessed through these instructions.

Figure 12:
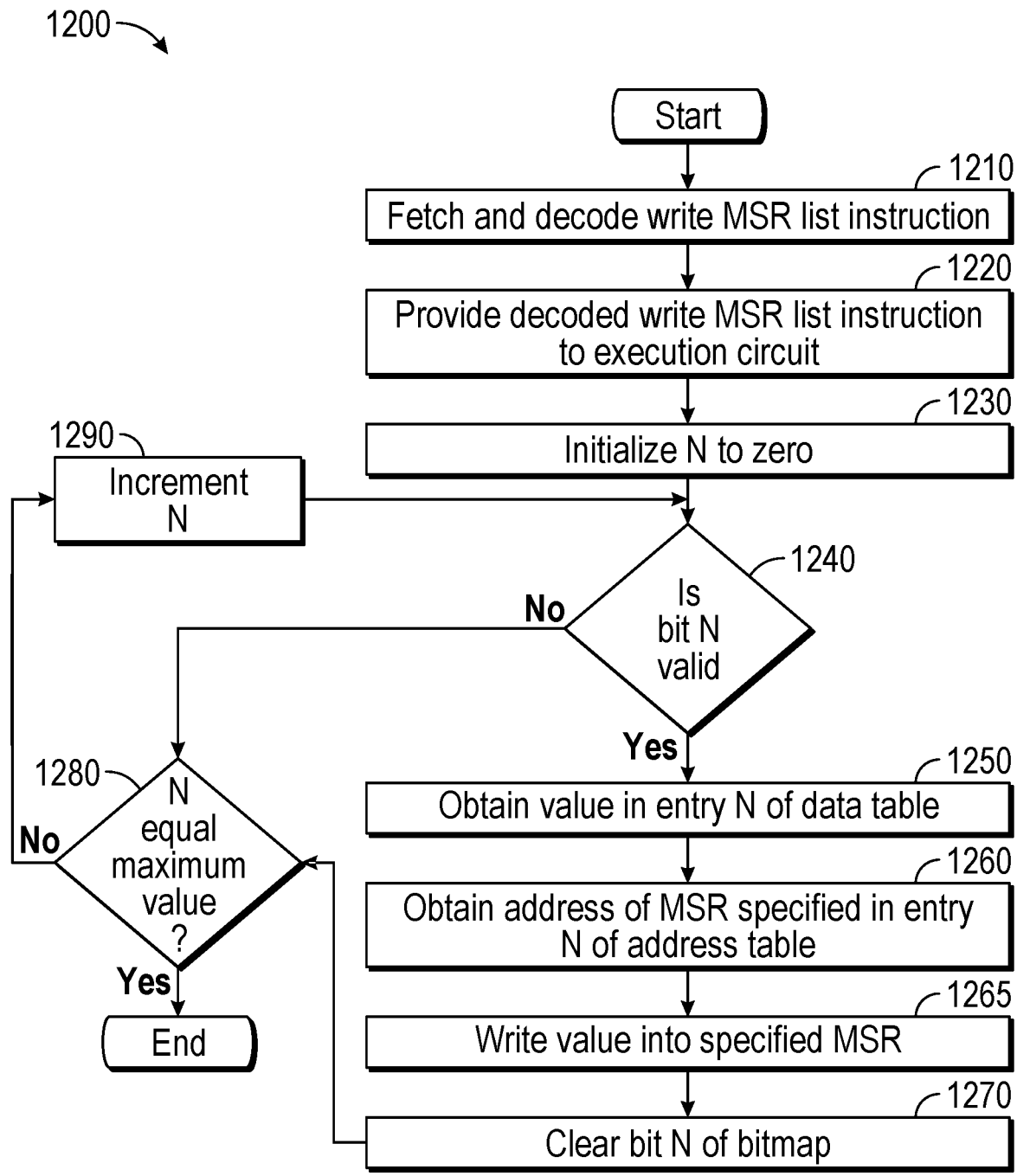
FIG. 12 is a flow diagram of a method according to an embodiment.

Referring now to FIG. 12, shown is a flow diagram of a method in accordance with another embodiment. More specifically, method 1200 is a method for executing a write MSR list instruction in accordance with an embodiment. As such, method 1200 may be executed in a processor having hardware circuitry (alone, and/or in combination with firmware and/or software) to implement list read and write instructions as described herein.

Method 1200 begins by fetching and decoding a write MSR list instruction (block 1210), which may be performed by a front end circuit. Next at block 1220 the front end circuit may provide the decoded write MSR list instruction to an execution circuit.

Control next passes to block 1230 where a variable N may be initialized to zero. Access may be made to a bitmap associated with this list to determine whether bit N of the bitmap is valid (diamond 1240). If so, control passes to block 1250 where the value present in entry N of the data table may be obtained. Next at block 1260 an address stored in entry N of the address table may be obtained. At block 1265, this value is written to the specified MSR. On successful writing of this MSR, at block 1270 bit N of the bitmap may be cleared.

Still with reference to FIG. 12, at diamond 1280 it may be determined whether the value of N equals the maximum value. If so, method 1200 may conclude. Otherwise control passes to block 1290 where N may be incremented and control passes back to diamond 1240. In this way multiple processor state values stored in a data table in memory can be accessed and written to corresponding MSRs in a performant manner. Understand while shown at this high level in the embodiment of FIG. 12, many variations and alternatives are possible.

The following examples pertain to further embodiments.

In one example, a processor includes: a front end circuit to fetch and decode a read list instruction, the read list instruction to cause storage, to a memory, of a software-provided list of processor state information; and an execution circuit coupled to the front end circuit, where the execution circuit, in response to the decoded read list instruction, is to read the processor state information stored in the processor and store each datum of the processor state information into an entry of a data table in the memory.

In an example, the processor further comprises a first register to store an address of the data table, where the read list instruction comprises a first operand to identify the first register.

In an example, the processor further comprises a second register to store an address of an address table in the memory to store addresses of a plurality of registers that store the processor state information, where the read list instruction comprises a second operand to identify the second register.

In an example, the execution circuit is to identify valid entries in the data table in which to store the processor state information based at least in part on a bitmap, the read list instruction comprising a third operand to identify a third register in which the bitmap is to be stored, where one or more of the first operand, the second operand and the third operand are implicit operands.

In an example, an application is to provide the read list instruction, the application to update the bitmap to identify one or more datum of the processor state information that the application did not modify.

In an example, the execution circuit is to clear a first indicator of the bitmap when a first datum of the processor state information associated with the first indicator has been stored to the entry of the data table.

In an example, after an interrupt during execution of the decoded read list instruction, the execution circuit is to resume execution of the decoded read list instruction at a next datum of the processor state information, based at least in part on the bitmap.

In an example, the execution circuit, in response to a decoded write list instruction, is to read the processor state information stored in the data table in the memory and, for each datum of the processor state information, write the datum into a register of the processor.

In an example, the read list instruction comprises a read MSR list instruction to read the processor state information from a plurality of MSRs of the processor.

In an example, an application is to provide the read MSR list instruction, the application to identify via the read MSR list instruction a set of MSRs that the application modified.

In an example, the application comprises a virtual machine, and in response to the read list MSR instruction provided by the virtual machine, the processor is to store the processor state information into the data table located in a protected portion of the memory, the protected portion inaccessible outside of the virtual machine.

In another example, a method comprises: identifying, by an application that executes on a processor, a set of processor state to be accessed by the application; requesting, by the application, allocation of an address table in a memory, the address table having a plurality of entries each to store an address of a storage element of the processor in which a portion of the set of processor state is to be stored; requesting, by the application, allocation of a data table in the memory, the data table having a plurality of entries each to store a portion of the set of processor state; and setting a bitmap to indicate valid entries in at least one of the address table and the data table, where in response to execution of a single read list instruction, the processor is to read the set of processor state and write the set of processor state to the data table.

In an example, the method further comprises executing, in the processor, the single read list instruction to read the set of processor state from a plurality of storage elements of the processor based on information in the address table and information in the bitmap.

In an example, executing the single read list instruction further comprises storing the set of processor state to entries of the data table based on the information in the bitmap.

In an example, the method further comprises executing, in the processor, a single write list instruction to read the set of processor state from the data table based on second information in the bitmap.

In an example, executing the single write list instruction further comprises storing the set of processor state to storage elements of the processor identified in the address table.

In an example, the method further comprises after execution of the single read instruction is interrupted, re-entering execution of the single read list instruction at a next portion of the set of processor state based at least in part on a next valid indicator in the bitmap.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system comprises a processor and a memory. The processor may include: a plurality of MSRs; a plurality of general-purpose registers; a front end circuit to fetch and decode a read MSR list instruction having a first operand to specify a first register of the plurality of general-purpose registers to store an address of a first table in a memory coupled to the processor, a second operand to specify a second register of the plurality of general-purpose registers to store an address of a second table in the memory, and a third operand to specify a third register of the plurality of general-purpose registers to store a bitmap, the read MSR list instruction to cause storage, to the memory, of a software-defined list of processor state information stored in at least a portion of the plurality of MSRs. The processor may further include an execution circuit coupled to the front end circuit, where the execution circuit, in response to the read MSR list instruction, is to read the processor state information from the portion of the plurality of MSRs and store each datum of the processor state information into an entry of the second table. The memory may store the first table and the second table.

In an example, the execution circuit is to access the bitmap to identify valid entries in the second table in which to store the processor state information, where when execution of the read MSR list instruction is interrupted, the processor is to re-enter execution of the read MSR list instruction at a selected datum of the processor state information based at least in part on the bitmap.

In an example, the execution circuit: in response to the read MSR list instruction, is to read the processor state information from the portion of the plurality of MSRs and store the processor state information comprising a first processor state into a first plurality of entries of the second table, the read MSR list instruction provided by a first application and where one or more of the first operand, the second operand and the third operand are implicit operands, and the second table located at a first address in the memory; and in response to a second read MSR list instruction, is to read second processor state information from a different portion of the plurality of MSRs and store the second processor state information comprising a second processor state into a second plurality of entries of the second table, the second read MSR list instruction provided by a second application and the second table located at a second address in the memory.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A processor comprising:
a front end circuit to fetch and decode a read list instruction, the read list instruction to cause storage, to a memory, of a software-provided list of processor state information;
a first register to store an address of a data table in the memory, wherein the read list instruction comprises a first operand to identify the first register;
a second register to store an address of an address table in the memory to store addresses of a plurality of registers that store the processor state information, wherein the read list instruction comprises a second operand to identify the second register; and
an execution circuit coupled to the front end circuit, wherein the execution circuit, in response to the decoded read list instruction, is to read the processor state information stored in the processor and store each datum of the processor state information into an entry of the data table in the memory.

2. The processor of claim 1, wherein the execution circuit is to identify valid entries in the data table in which to store the processor state information based at least in part on a bitmask, the read list instruction comprising a third operand to identify a third register in which the bitmask is to be stored, wherein one or more of the first operand, the second operand and the third operand are implicit operands.

3. The processor of claim 2, wherein an application is to provide the read list instruction, the application to update the bitmask to identify one or more datum of the processor state information that the application did not modify.

4. The processor of claim 2, wherein the execution circuit is to clear a first indicator of the bitmask when a first datum of the processor state information associated with the first indicator has been stored to the entry of the data table.

5. The processor of claim 2, wherein, after an interrupt during execution of the decoded read list instruction, the execution circuit is to resume execution of the decoded read list instruction at a next datum of the processor state information, based at least in part on the bitmask.

6. The processor of claim 1, wherein the execution circuit, in response to a decoded write list instruction, is to read the processor state information stored in the data table in the memory and, for each datum of the processor state information, write the datum into a register of the processor.

7. The processor of claim 1, wherein the read list instruction comprises a read model specific register (MSR) list instruction to read the processor state information from a plurality of MSRs of the processor.

8. The processor of claim 7, wherein an application is to provide the read MSR list instruction, the application to identify via the read MSR list instruction a set of MSRs that the application modified.

9. The processor of claim 8, wherein the application comprises a virtual machine, and in response to the read list MSR instruction provided by the virtual machine, the processor is to store the processor state information into the data table located in a protected portion of the memory, the protected portion inaccessible outside of the virtual machine.

10. A system
comprising: a processor comprising:
a plurality of model specific registers (MSRs);
a plurality of general-purpose registers;
a front end circuit to fetch and decode a read MSR list instruction having a first operand to specify a first register of the plurality of general-purpose registers to store an address of a first table in a memory coupled to the processor, a second operand to specify a second register of the plurality of general-purpose registers to store an address of a second table in the memory, and a third operand to specify a third register of the plurality of general-purpose registers to store a bitmask, the read MSR list instruction to cause storage, to the memory, of a software-provided list of processor state information stored in at least a portion of the plurality of MSRs; and
an execution circuit coupled to the front end circuit, wherein the execution circuit, in response to the read MSR list instruction, is to read the processor state information from the portion of the plurality of MSRs and store each datum of the processor state information into an entry of the second table; and
the memory coupled to the processor, wherein the memory is to store the first table and the second table.

11. The system of claim 10, wherein the execution circuit is to access the bitmask to identify valid entries in the second table in which to store the processor state information, wherein when execution of the read MSR list instruction is interrupted, the processor is to re-enter execution of the read MSR list instruction at a selected datum of the processor state information based at least in part on the bitmask.

12. The system of claim 10, wherein the execution circuit:
in response to the read MSR list instruction, is to read the processor state information from the portion of the plurality of MSRs and store the processor state information comprising a first processor state into a first plurality of entries of the second table, the read MSR list instruction provided by a first application and wherein one or more of the first operand, the second operand and the third operand are implicit operands, and the second table located at a first address in the memory; and
in response to a second read MSR list instruction, is to read second processor state information from a different portion of the plurality of MSRs and store the second processor state information comprising a second processor state into a second plurality of entries of the second table, the second read MSR list instruction provided by a second application and the second table located at a second address in the memory.

13. A method comprising:
fetching and decoding, in a front end circuit of a processor, a write machine specific register (MSR) list instruction having:
a first operand to specify a first register of the processor to store an address of a first table in a memory coupled to the processor,
a second operand to specify a second register of the processor to store an address of a second table in the memory, and a third operand to specify a third register of the processor to store a bitmask, the write MSR list instruction to obtain processor state information from the memory;

providing the decoded write MSR list instruction to an execution circuit of the processor;

in response to a valid bit of the bitmask, obtaining a value stored in a first entry of the first table and obtaining an address of a MSR specified in a first entry of the second table; and writing the value into the MSR specified in the first entry of the second table.

14. The method of claim 13, further comprising iteratively obtaining a value stored in an entry of the first table and obtaining an address of a MSR specified in an entry of the second table for a software-provided list of MSRs.

15. The method of claim 13, further comprising fetching and decoding the write MSR list instruction having the first operand, the second operand, and the third operand comprising implicit operands.

16. The method of claim 13, further comprising clearing the bit of the bitmask when the value has been written into the MSR.

17. The method of claim 13, further comprising fetching and decoding the write MSR instruction comprising a single instruction to read a set of processor state information and store the set of processor state information into a plurality of MSRs.

18. The method of claim 17, further comprising storing the set of processor state information into the plurality of MSRs having a valid bit in the bitmask.

\* \* \* \* \*